United States Patent
Kappla et al.

(10) Patent No.: US 11,259,169 B2
(45) Date of Patent: Feb. 22, 2022

(54) HIGHLY SCALABLE HOME SUBSCRIBER SERVER

(71) Applicant: MICROSOFT TECHNOLGY LICENSING, LLC, Redmond, WA (US)

(72) Inventors: Srinivas Kappla, Nashua, NH (US); Prasasth Palnati, Westford, MA (US); Ronald M. Parker, Boxborough, MA (US)

(73) Assignee: MICROSOFT TECHNOLGY LICENSING, LLC, Redmond, WA (US)

( * ) Notice: Subject to any disclaimer, the term of this patent is extended or adjusted under 35 U.S.C. 154(b) by 12 days.

(21) Appl. No.: 16/137,915

(22) Filed: Sep. 21, 2018

(65) Prior Publication Data

US 2019/0090120 A1  Mar. 21, 2019

Related U.S. Application Data

(60) Provisional application No. 62/561,248, filed on Sep. 21, 2017.

(51) Int. Cl.
| | |
|---|---|
| *H04W 8/04* | (2009.01) |
| *G06F 16/245* | (2019.01) |
| *H04W 8/18* | (2009.01) |
| *H04W 24/08* | (2009.01) |
| *G06F 9/455* | (2018.01) |

(52) U.S. Cl.
CPC .......... *H04W 8/04* (2013.01); *G06F 9/45558* (2013.01); *G06F 16/245* (2019.01); *H04W 24/08* (2013.01); *G06F 2009/45595* (2013.01); *H04W 8/18* (2013.01)

(58) Field of Classification Search
None
See application file for complete search history.

(56) References Cited

U.S. PATENT DOCUMENTS

| | | | | |
|---|---|---|---|---|
| 5,974,425 A * | 10/1999 | Obermarck | ......... | G06F 11/1471 707/682 |
| 6,810,259 B1 * | 10/2004 | Zhang | ...................... | H04W 8/18 455/435.1 |
| 9,198,158 B2 * | 11/2015 | Knauft | ................... | H04W 68/04 |
| 9,681,003 B1 * | 6/2017 | Kim | ...................... | H04M 15/66 |

(Continued)

*Primary Examiner* — James P Duffy
(74) *Attorney, Agent, or Firm* — Ray Quinney & Nebeker P.C; James Bullough

(57) ABSTRACT

A system for storing and managing subscription information for a plurality of subscribers in a mobile communications network is provided. The system comprises a first database, a second database, and one or more processors. The processors are configured to receive a request relating to a subscriber, determine that the first database lacks a desired record relating to the subscriber, retrieve the desired record from the second database, write the retrieved desired record to the first database, and perform one or more functions related to the desired record according to the request. In some embodiments, the one or more processors are configured to predict a time of a potential occurrence of one or more future connections related to the plurality of subscribers and before the predicted time, copy one or more records related to the plurality of subscribers from the second database to the first database.

18 Claims, 7 Drawing Sheets

(56) References Cited

U.S. PATENT DOCUMENTS

2005/0015374 A1* 1/2005 Reinauer ............. G06F 12/0868
2009/0150400 A1* 6/2009 Abu-Hakima ........ G06F 16/951
2013/0290371 A1* 10/2013 Le Pennec ........ G06F 16/24539
                                                                            707/769

* cited by examiner

HIGHLY SCALABLE HOME SUBSCRIBER SERVER

CROSS-REFERENCE TO RELATED APPLICATIONS

This application claims priority under 35 U.S.C. § 119(e) to U.S. Provisional Application No. 62/561,248 filed on Sep. 21, 2017, the entire contents of which are incorporated herein by reference.

BACKGROUND OF THE INVENTION

Field of Invention

The invention generally relates to a Home Subscriber Server for an Evolved Packet Core (EPC) network system. In particular, the invention relates to techniques for storing user/subscriber information in an Home Subscriber Server.

Description of Related Art

The Home Subscriber Server (HSS) is the main subscriber database of a Long Term Evolution (LTE) network configuration. The HSS stores permanent subscription information for each subscriber in the network. The HSS works with other nodes in the LTE to share information needed by the nodes. For example, the HSS receives updates about subscribers from a network's Mobile Management Entity (MME) and provides authentication information to the MME based on the permanent subscription data stored for a particular user.

Current $3^{rd}$ Generation Partnership Project specifications describe multiple front-end interfaces that enable other LTE network entities to exchange information with the HSS having a single subscriber database (or clustered subscriber database). For network configurations focused on Narrow-Band Internet of Things devices (NB-IoT devices), an HSS could be expected to manage subscriber information for hundreds of millions, or more, subscriber devices for a single operator. Such a configuration is expected to suffer from poor scalability due to increasing latency as the number of NB-IoT subscriber profiles grows and the number of simultaneous transactions that retrieve and modify the subscriber profiles increases. What is needed is a faster and/or more efficient information management architecture in an HSS that enables the HSS to scale with the number of subscriber profiles stored thereon.

BRIEF SUMMARY OF THE INVENTION

Embodiments of the invention include an HSS that includes a Permanent State Database (PSDB) and a Dynamic State Database (DSDB) for storing subscriber information. The Permanent State Database is the authoritative repository for subscriber information and, thus, is "permanent" in the sense that the subscriber information is maintained in the PSDB during the time the subscriber is a member of the network. To be clear, individual subscriber information (e.g., subscriber profiles) in the PSDB can be changed over time. Meanwhile, the DSDB holds information for subscribers that have currently active transactions. Information for a subscriber is read from the PSDB and written into the DSDB. The information remains in the DSDB for the duration of a transaction. When the transaction concludes, any updated DSDB information can be written back to the PSDB, if appropriate.

In some implementations of the HSS, the subscriber profile information is copied into the DSDB from the PSDB a short time before it is needed based on a learned or configured schedule of subscriber access to the network.

In some embodiments, the present disclosure relates to a system for storing and managing subscription information for a plurality of subscribers in a mobile communications network. The system comprises a first database of a first type, a second database of a second type, and one or more processors. The one or more processors are configured to receive a request relating to a subscriber, determine that the first database lacks a desired record relating to the subscriber, retrieve the desired record from the second database, write the retrieved desired record to the first database, and perform one or more functions related to the desired record according to the request.

In some embodiments, the one or more processors are configured to monitor connections of the plurality of subscribers, determine a pattern according to which the plurality of subscribers attach to the mobile communications network based on the monitored connections of the plurality of subscribers, predict a time of a potential occurrence of one or more future connections related to the plurality of subscribers based on the pattern, and before the predicted time, copy one or more records related to the plurality of subscribers from the second database to the first database.

In some embodiments, the one or more processors are further to determine, during a setup process, a future time span during which the subscriber is configured to attach to the mobile communications network, and copy the record relating to the subscriber from the second database to the first database based on the future time span.

In some embodiments, the one or more processors are further configured to monitor communications between network entities, detect event notifications related to the plurality of subscribers, determine a pattern according to which the plurality of subscribers attach to the mobile communications network based on the event notifications, predict a time of a potential occurrence of one or more future connections based on the pattern, and before the predicted time, copy one or more records related to the plurality of subscribers from the second database to the first database based on the one or more predicted future connections.

In some embodiments, predicting a time of a potential occurrence of one or more future connections comprises collecting information related to one or more of a location, an access time, a duration of access, a frequency of access, a device type, and a subscription parameter, and analyzing the collected information using a machine learning algorithm.

In some embodiments, the first database and second database are implemented as a virtual machine, a container, or a container on a virtual machine.

In some embodiments, the one or more processors are configured to predict a time of a potential future request relating to the subscriber, retain the desired record in the first database at least until after the predicted time of the potential future request relating to the subscriber, and remove the desired record from the first database after the predicted time of the potential future request relating to the subscriber.

In some embodiments, the second database provides records to more than one database of the first type.

In some embodiments, the first type comprises one or more of a NoSQL database, a horizontal data partition, an in-memory database, and a flash memory-based database.

In some embodiments, the second type comprises a SQL database.

In some embodiments, the present disclosure relates to a method for storing and managing subscription information for a plurality of subscribers in a mobile communications network. The method comprises receiving a request relating to a subscriber; determining that the first database lacks a desired record relating to the subscriber; retrieving the desired record from the second database; and performing one or more functions related to the record according to the request.

In some embodiments, the method further comprises monitoring connections of the plurality of subscribers, determining a pattern according to which the plurality of subscribers attach to the mobile communications network based on the monitored connections of the plurality of subscribers, predicting a time of a potential occurrence of one or more future connections related to the plurality of subscribers based on the pattern, and before the predicted time, copying one or more subscriber records related to the plurality of subscribers from the second database to the first database.

In some embodiments, predicting a time of potential occurrence of one or more future connections comprises collecting information related to one or more of a location, an access time, a duration of access, a frequency of access, a device type, and a subscription parameter, and analyzing the collected information using a machine learning algorithm.

In some embodiments, the method further comprises determining, during a setup process, a future time span during which the subscriber is configured to attach to the mobile communications network, and copying the record relating to the subscriber from the second database to the first database based on the future time span.

In some embodiments, the method further comprises monitoring communications between network entities, detecting event notifications related to the plurality of subscribers, determining a pattern according to which the plurality of subscribers attach to the mobile communications network based on the event notifications, predicting a time of a potential occurrence of one or more future connections based on the pattern, and before the predicted time, copying one or more records related to the plurality of subscribers from the second database to the first database based on the one or more predicted future connections.

In some embodiments, the first database and second database are implemented as a virtual machine, a container, or a container on a virtual machine.

In some embodiments, the method further comprises predicting a time of a potential future request relating to the subscriber, retaining the desired record in the first database at least until after the predicted time of the potential future request relating to the subscriber, and removing the desired record from the first database after the predicted time of the potential future request relating to the subscriber.

In some embodiments, the second database provides records to more than one database of the first type.

In some embodiments, the first type comprises one or more of a NoSQL database, a horizontal data partition, an in-memory database, and a flash memory-based database.

In some embodiments, the second type comprises a SQL database.

BRIEF DESCRIPTION OF THE SEVERAL VIEWS OF THE DRAWING

For a more complete understanding of various embodiments of the disclosed subject matter, reference is now made to the following descriptions taken in connection with the accompanying drawings, in which.

DETAILED DESCRIPTION

Embodiments of the invention include an HSS that includes a PSDB and a DSDB for storing subscriber information. The Permanent State Database is the authoritative repository for subscriber information and, thus, is "permanent" in the sense that the subscriber information is maintained in the PSDB during the time the subscriber is a member of the network. To be clear, individual subscriber information (e.g., subscriber profiles) in the PSDB can be changed over time. Meanwhile, the DSDB holds information for subscribers that have currently active transactions. Information for a subscriber is read from the PSDB and written into the DSDB. The information remains in the DSDB for the duration of a transaction. When the transaction concludes, any updated DSDB information can be written back to the PSDB, if appropriate.

Figure 1:
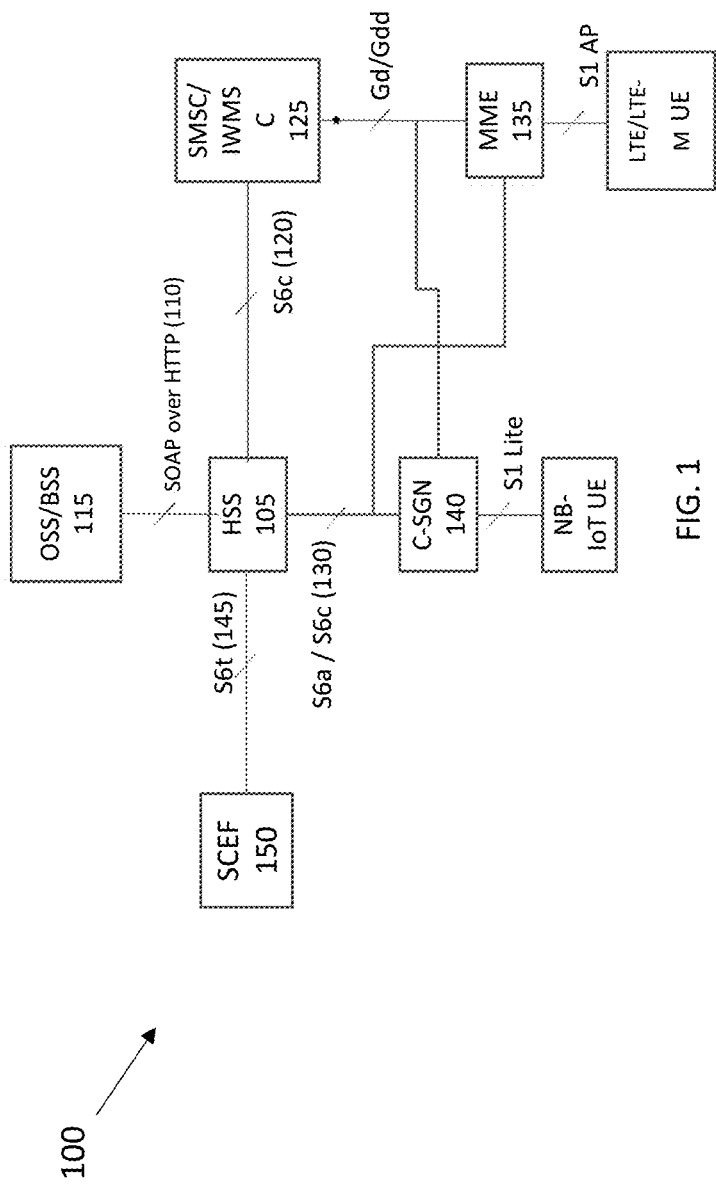
FIG. 1 illustrates a configuration of LTE network configuration, in accordance with some embodiments of the invention.

FIG. 1 illustrates a configuration of LTE network configuration 100 that includes an embodiment of an HSS 105. HSS 105 has multiple front-end interfaces, which may include, but are not limited to, a Simple Object Access Protocol (SOAP) over Hypertext Transfer Protocol (HTTP) interface 110 to an Operations Support System/Business Support System (OSS/BSS) 115, an S6c interface 120 to a Short Message Service Center/Interworking Mobile Switching Center (SMSC/IWMSC) 125, an S6a/S6c interface 130 to a Mobile Management Entity (MME) 135 and/or Cellular IoT Serving Gateway Node (C-SGN) 140, and an S6t interface 145 to a Service Capability Exposure Function (SCEF) entity 150.

Figure 2:
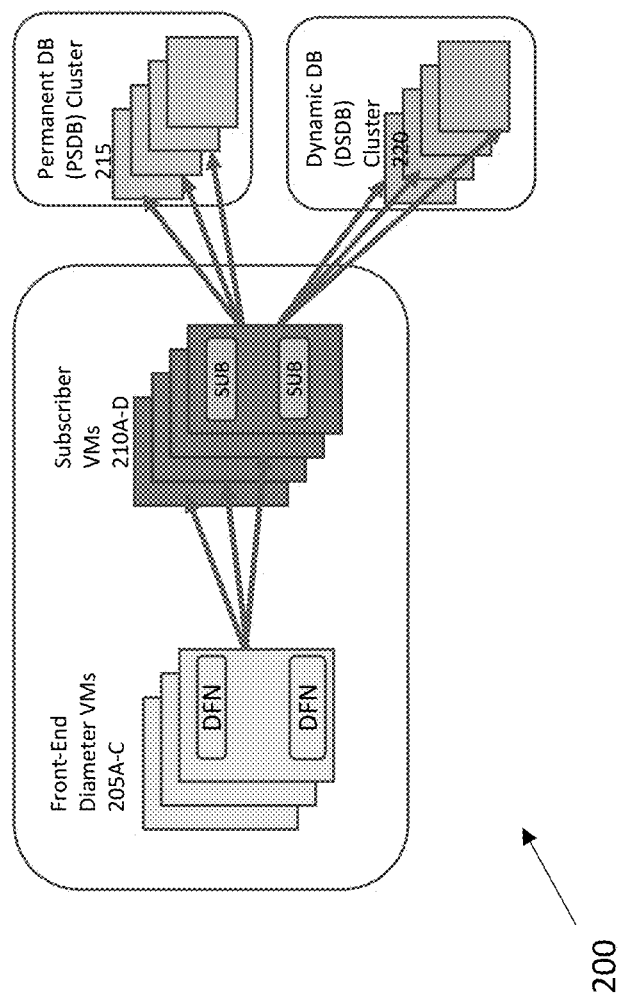
FIG. 2 illustrates a Home Subscriber Server, in accordance with some embodiments of the invention.

FIG. 2 illustrates an implementation of an HSS 200 in more detail. HSS 200 can be used in place of HSS 105 in FIG. 1. HSS 200 is shown as a virtualized function in FIG. 2. Specifically, HSS 200 includes front-end DIAMETER virtual machine (VM) instances 205A-C that route requests from other network nodes to subscriber process VM instances 210A-D. It should be understood that VM instances can be implemented as a software process, a VM, a container, or a container in a VM. The subscriber process VMs 210A-D interact with PSDB 215 and DSDB 220 to retrieve and store subscriber information in response to the HSS's interaction with other network nodes. In response to a request for subscriber information (i.e., the start of a "transaction"), VM 210 first checks the DSDB 220 for the needed information. If the information is not present in DSDB, the HSS 200 retrieves the information from the PSDB 215 and writes the information to the DSDB 220. The subscriber information resides in the DSDN 220 at least for the duration of the transaction. At the conclusion of the transaction, the subscriber information, if changed, is written back to the PSDB 215.

Because the PSDB 215 is the permanent repository for subscriber information, it is expected that this database will experience read operations more frequently than write operations. Also, is it expected to scale with the number of subscribers added to the network. While write operations are supported, those operations will typically be lower in number that read operations and would involve provisioning new users, user location updates from an MME, updates to the HSS from an SCEF, operator OSS/BSS solutions, and/or other operations that update properties associated with a subscriber. Because read operations from the PSDB occur only at the start of a transaction, the PSDB can tolerate some amount of latency. For example, the PSDB can use disk storage. However, the PSDB cannot tolerate data loss, as the PSDB is the permanent repository for user profile information. Illustrative examples of PSDB implementations include SQL databases from Oracle or Microsoft, Cassandra databases, and/or other similar database systems. In some embodiments, the type of implementation used for the PSDB is chosen primarily based on its capacity for scalability. Speed is a secondary factor.

In contrast, the DSDB 220 is expected to experience reads and writes during the duration of a transaction for attached user devices (also called User Equipment (UE)). For this reason, in certain implementations, the latency of the DSDB is lower than that of the PSDB to achieve the benefits described herein. Moreover, the DSDB can experience data loss because the HSS can re-read the needed data from the PSDB to begin a new transaction. Illustrative examples of DSDB implementations using currently available solutions include, but are not limited to, NoSql databases, in-memory databases, horizontal data partitioning (i.e., database shards), and flash memory-based databases. Because the DSDB only retains information for active transactions (e.g., attached UEs), and each interface to the HSS is limited to a maximum number of transactions per time, the DSDB will scale with the number of interfaces of the HSS. In some embodiments, the type of implementation used for the DSDB is chosen primarily for its speed.

Thus, embodiments of the invention are characterized in the PSDB has low, to no, data loss relative to the DSDB, the DSDB has lower latency that the PSDB, and the PSDB scales with the number of subscribers/UE whereas the DSDB scales with the number of interfaces present in the HSS. This enables the PSDB to scale with the total number of configured subscribers (e.g., billions of subscriber records), while the DSDB scales with the number of attached subscribers. Such a configuration reduces the number of read/write operations experienced by any one database instance. The embodiments shown herein illustrate the PSDB and DSDB as residing "outside" the HSS functional box. For example, the HSS can communicate with DSDB and/or PSDB instances that are functionally separate from the HSS. However, the PSDB and/or DSDB can be part of the HSS implementation and remain within the scope of the invention.

Either or both of the PSDB 215 and DSDB 220 can be a stand-alone instance or can be implemented as a cluster. The PSDB 215 and DSDB 220 can be supported by the same cluster or different clusters. Meanwhile, a single PSDB instance can be shared among a plurality of HSS nodes. Using known techniques, the VMs of the HSS 200 can be load balanced while still employing embodiments of the invention. Likewise, the PSDB can be implemented using known database redundancy techniques (e.g., using mirrored active and standby sites or using geographically distributed database clusters.) While the functions of the HSS 200 are described above as VM instances, in some embodiments, the HSS functions are implemented as containers or as microservices. Further, while separating the front-end VMs from the subscriber VMs allows the functions to scale independently, the front-end VMs and subscriber VMs described herein can be combined into one VM. Other VMs, e.g., for configuration, statistics, and/or log gathering, can be included in the HSS.

Figure 3:
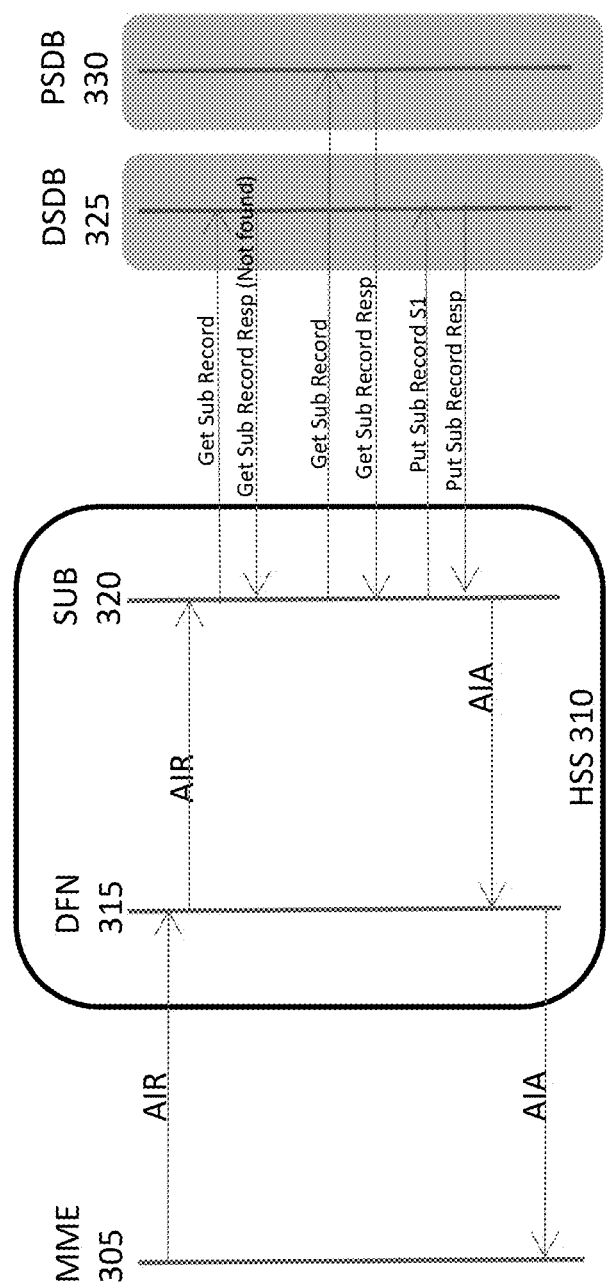
FIG. 3 is a simplified call flow diagram showing authentication of a subscriber, in accordance with some embodiments of the invention.

FIG. 3 is a simplified call flow diagram 300 showing authentication of a subscriber, in accordance with some embodiments of the invention. MME 305 makes an Authentication Informational Request (AIR) to HSS 310. A DIAMETER Front End VM (DFN) 315 receives the request and routes it to a subscriber VM (SUB) 320 within the HSS 310. It should be understood that VM instances described herein can be implemented as a software process, a VM, a container, or a container in a VM. The subscriber VM 320 first requests the subscriber record from DSDB 325. If the subscriber record is not found within DSDB 325, the DSDB returns a response indicating the subscriber record is not found. The subscriber VM 320 then queries the PSDB 330 for the subscriber record. The PSDB 330 responds to the subscriber VM 320 of the HSS 310 request with the subscriber profile record. The HSS 310, in turn, writes the subscriber record to the DSDB 325, which replies with a response acknowledging that the subscriber record has been added to DSDB 325.

The subscriber VM 320 routes an Authentication Informational Answer (AIA) to the relevant DFN 315, which in turn routes the AIA back to the requesting MME 305. As described elsewhere herein, the subscriber record remains in the DSDB 325 for the duration of the relevant transaction. Thus, the subscriber profile information is available to the HSS 310 for low-latency access to satisfy further requests or for modification by the HSS 310, as described below.

Figure 4:
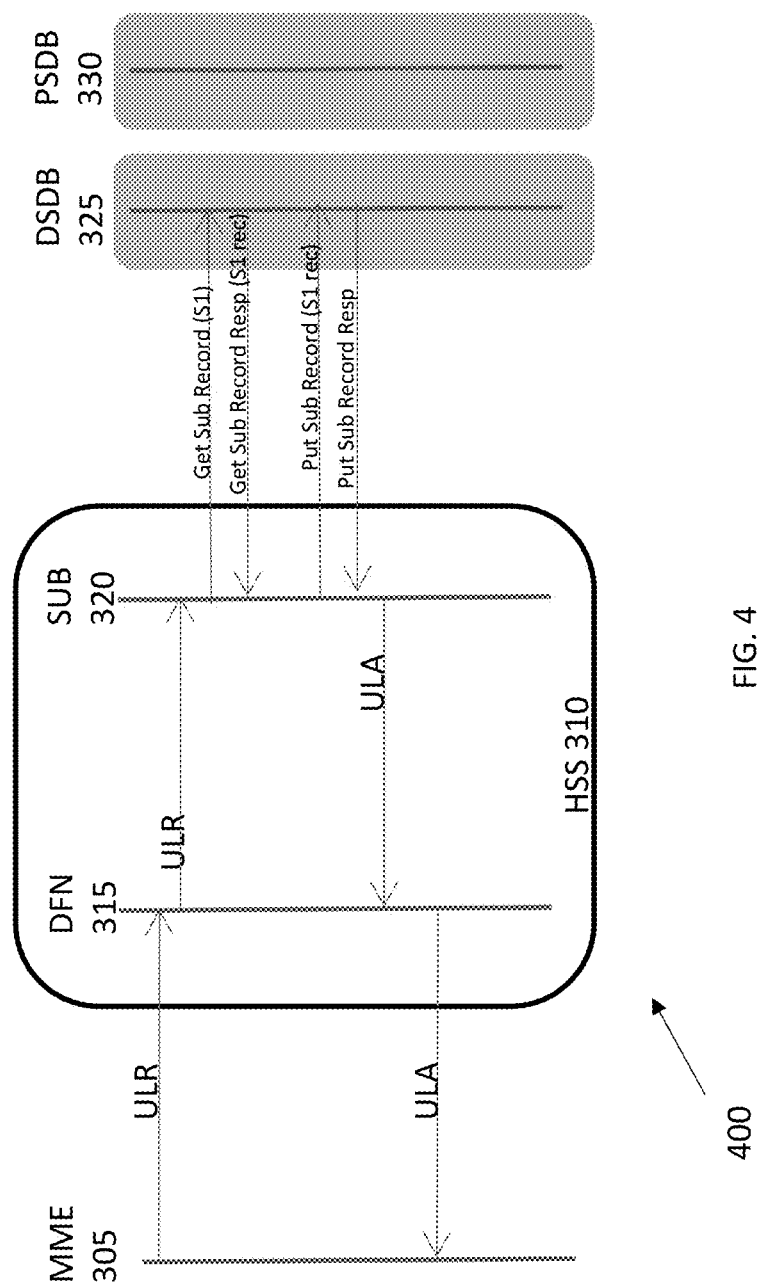
FIG. 4 is a simplified call flow diagram showing a location update and subscriber information retrieval, in accordance with some embodiments of the invention.

FIG. 4 is a simplified call flow diagram 400 showing a location update and subscriber information retrieval, in accordance with some embodiments of the invention. MME 305 makes an Update Location Request (ULR) to HSS 310. DIAMETER Front End VM 315 receives the request and routes it to a subscriber VM 320 within the HSS 310. The subscriber VM 320 requests the subscriber record from DSDB 325. Because the subscriber is still attached, DSDB 325 responds to the subscriber VM 320 of the HSS 310 request with the subscriber profile record. Subscriber VM 320 updates the subscriber record with the identity of the MME 305 and returns the subscriber information to DFN 315 as part of a Update Location Answer (ULA). DNF 315, in turn passes the ULA, along with the relevant subscriber information to MME 305.

Figure 5:
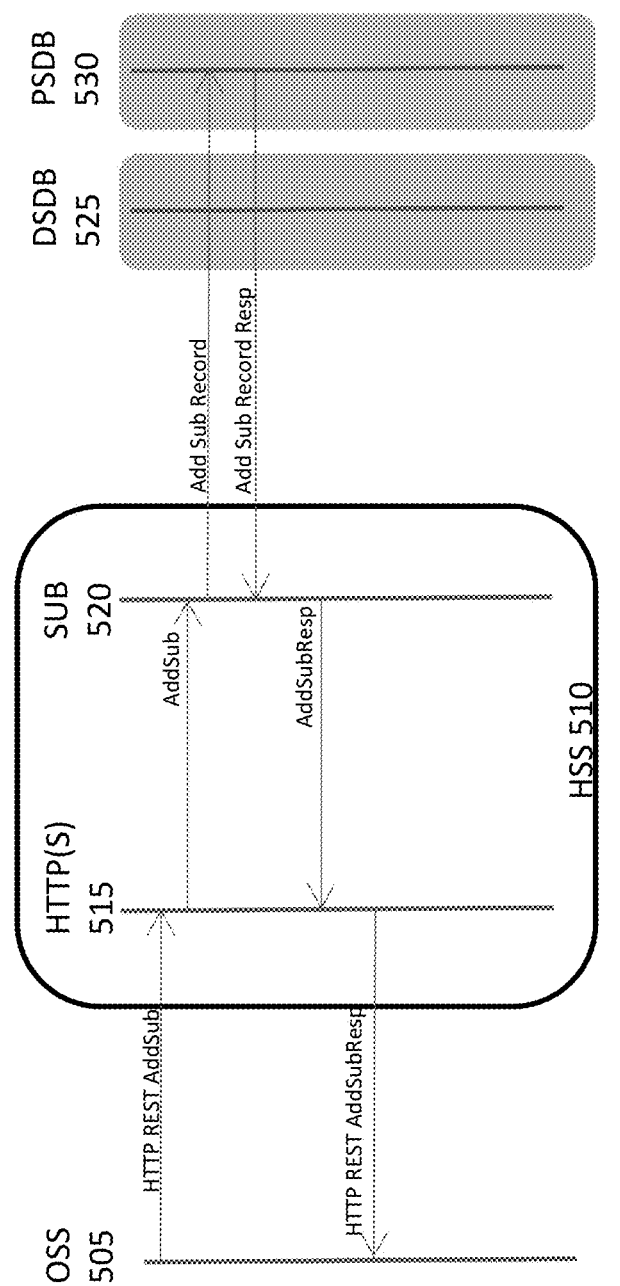
FIG. 5 is a simplified call flow diagram that shows adding a subscriber, in accordance with some embodiments of the invention.

FIG. 5 is a simplified call flow diagram 500 that shows adding a subscriber, in accordance with some embodiments of the invention. OSS 505 sends a request to HSS 510 to add a new subscriber to the network via, e.g., HTTP(S) REST protocol. An HTTP(S) front-end 515 receives the request and routes the information to the subscriber VM (SUB) 520. Because the HSS 510 is adding a new subscriber to the network, the SUB VM 520 bypasses the DSDB 525 and adds the subscriber profile information to PSDB 530. This is so because the PSDB 530 is the permanent repository of subscriber information for the network. PSDB 530 sends a response to the relevant SUB VM 520 indicating the subscriber was successfully provisioned. The SUB VM 520, in turn, routes the response to the relevant HTTP(S) front-end 515. The front-end sends a response to OSS 505 indicating the subscriber has been successfully added to the network.

Figure 6:
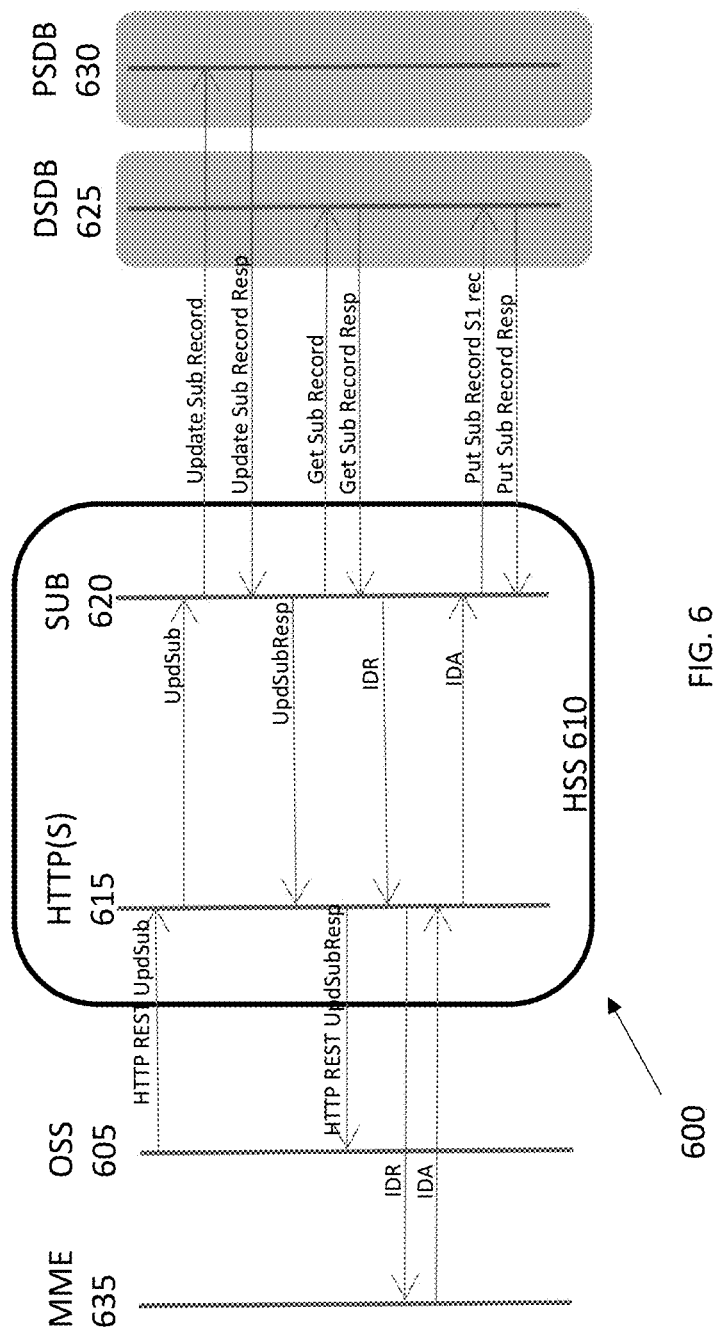
FIG. 6 is a simplified call flow diagram showing an update to an attached subscriber, in accordance with some embodiments of the invention.

FIG. 6 is a simplified call flow diagram 600 showing an update to an attached subscriber, in accordance with some embodiments of the invention. OSS 605 sends a request to HSS 610 to update subscriber information for a subscriber presently configured on the network via, e.g., HTTP(S) REST protocol. An HTTP(S) front-end 615 receives the request and routes the information to a SUB VM 620. Because the HSS 610 is updating information about the subscriber, the SUB VM 620 bypasses the DSDB 625 and modifies the subscriber profile information in PSDB 630. This is so because the PSDB 630 is the permanent repository of subscriber information for the network, and the update is a single operation without the need to copy the information into the DSDB 625, update the information, and write the information back to the PSDB 630. Thus, future retrievals of the subscriber information from the PSDB 630 will have the updated information. Also, if the same record exists in the DSDB 625, that information will not be written back to the PSDB 630 until the end of the transaction, and only after correctly updating the DSDB 625 with the changed information. PSDB 630 sends a response to the relevant SUB VM 620 indicating the subscriber information was successfully updated. The SUB VM 620, in turn, routes the response to the relevant HTTP(S) front-end 615. The front-end sends a response to OSS 605 indicating the subscriber information has been successfully updated. In parallel, SUB VM 620 copies the subscriber information into DSDB 625 to prepare for a UE-related transaction.

The HSS 610, via SUB VM 620, also queries DSDB 625 to retrieve information pertaining to the subscriber in the network. This is so because, as described above, DSDB 625 maintains the active state information of the subscriber for the duration of the time the subscriber/UE is interacting with HSS 610. SUB VM 620 combines the current subscriber profile information from DSDB 625 with the updated subscriber information that was written to PSDB 630 (or replaces the information in DSDB 625 for the updated subscriber) and routes it to an HTTP(S) front-end 615 in an Insert Subscription Data Request (IDR). The front-end 615 send the IDR to MME 635. MME 635 updates the subscriber information at the MME and replies to the HSS 610 with an Insert Subscription Data Answer (IDA), indicating a successfully update of the MME, via front-end 615 and SUB VM 620. SUB VM 620, in turn, updates the active subscriber information for the attached subscriber in DSDB 625 for use during the remaining transaction(s), and DSDB 625 responds to HSS 610 indicating the subscriber profile has been successfully updated.

Figure 7:
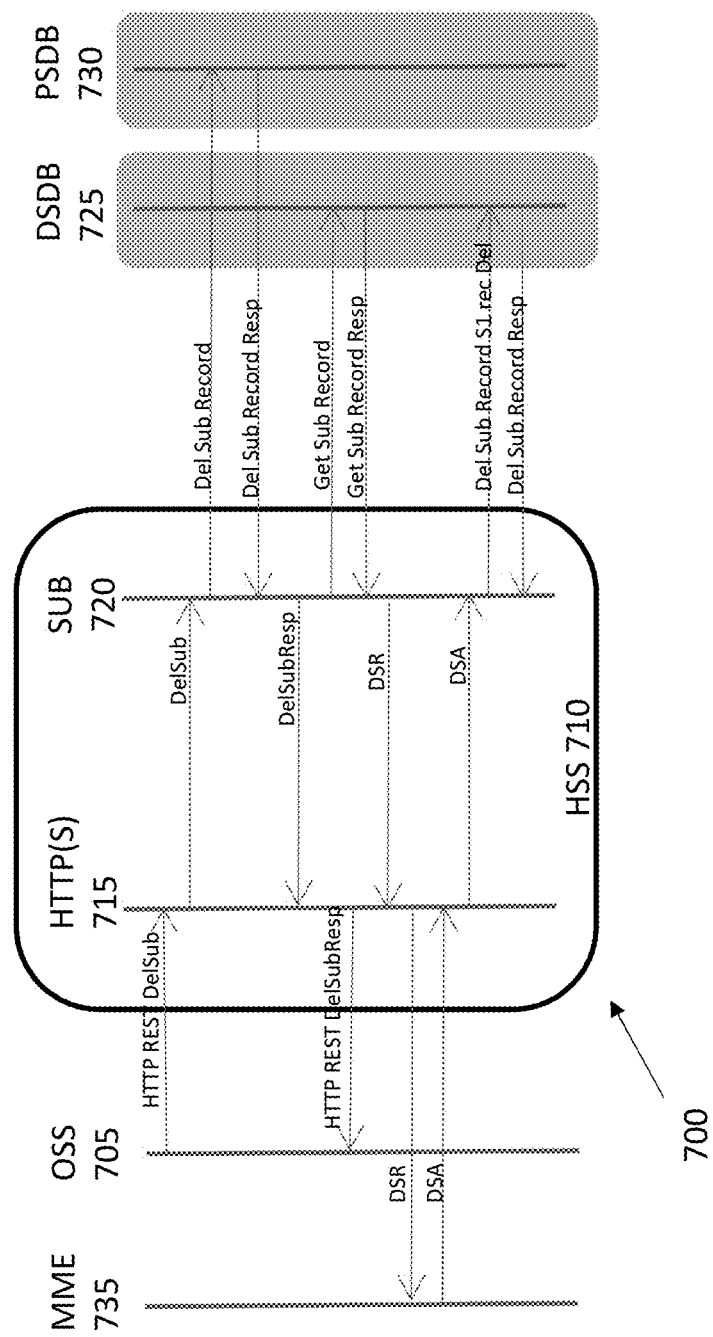
FIG. 7 is a simplified call flow diagram showing deletion of an attached subscriber, in accordance with some embodiments of the invention.

FIG. 7 is a simplified call flow diagram 700 showing deletion of an attached subscriber, in accordance with some embodiments of the invention. OSS 705 sends a request to HSS 710 to delete a presently attached subscriber from the network via, e.g., HTTP(S) REST protocol. An HTTP(S) front-end 715 receives the request and routes the information to a SUB VM 720. Because the HSS 710 is removing the attached subscriber from the network, the SUB VM 720 initially bypasses the DSDB 725 and deletes the subscriber profile from PSDB 730. This ensures that the deletion is immediately visible to all entities requesting the deleted subscriber's information. PSDB 730 sends a response to the relevant SUB VM 720 indicating the subscriber has been removed. The SUB VM 720, in turn, routes the response to the relevant HTTP(S) front-end 715. The front-end sends a response to OSS 705 indicating the subscriber information has been successfully removed.

The HSS 710, via SUB VM 720, also queries DSDB 725 to retrieve other information pertaining to the current state of the subscriber in the network. This is so because, as described above, DSDB 725 maintains the active state information of the subscriber during the time the subscriber/UE is attached, and some subscriber information may have changed during the transaction(s). SUB VM 720 uses the current subscriber profile information from DSDB 725 to identify the subscriber because only the DSDB 725 contains the subscriber information when deleting the attached subscriber from the network. Again, this is needed because only the DSDB 725 has the information relevant to the subscriber (including the identity of the relevant MME). SUB VM 720 routes the information to an HTTP(S) front-end 715 as part of a Delete Subscriber Data Request (DSR). The front-end 715 send the DSR to MME 735. MME 735 removes the subscriber information from the MME and replies to the HSS 710 with a Delete Subscriber Data Answer (DSA), indicating the subscriber has been successfully removed from the MME, via front-end 715 and SUB VM 720. SUB VM 720, in turn, deletes the active subscriber information for the attached subscriber from DSDB 725, and DSDB 725 responds to HSS 71—indicating the subscriber profile has been successfully deleted.

Although not shown in the call flows, in any of the above examples (except where the subscriber is deleted from the network), the HSS can write any needed subscriber profile changes present in the DSDB to the PSDB at the end of a transaction(s) when the subscriber information has been present in the DSDB for a given time-out period. At that point, the DSDB record is reconciled with the latest subscriber information in the PSDB, and one correctly updated record is retained in the PSDB (e.g., for example, subscriber information that correctly identifies a present attribute of the subscriber overwrites an older version.) Thus, the next access of the subscriber information in the PSDB will retrieve the latest information.

As described above, maintaining only attached subscriber information in a lower-latency DSDB (relative to a PSDB) reduces the latency experienced by the HSS when accessing subscriber information while reducing or avoiding the need to scale the DSDB with the total number of subscribers in the network (i.e., both attached and unattached subscribers.) When implementations of the HSS query a DSDB for subscriber information at the start of a transaction (e.g., the subscriber's UE is attaching), but the subscriber information is not present in the DSDB, the HSS retrieves the information from the PSDB and writes the information to the DSDB. In this way, the subscriber's information is copied from its permanent repository (the PSDB) into a relatively lower-latency DSDB only when the subscriber information is presently needed. Additional latency reduction advantages are possible by predictively retrieving certain subscriber profile information a short time before the information is needed.

Certain NB-IoT devices have a regular pattern of access and communication with the network. For example, a water utility meter in a remote location may "wake" every 24 hours and attach to the network to communicate current meter readings and other information. Implementations of the HSS of the present invention monitor connection activity of the UEs and "learn" the pattern according to which the subscribers attach. Using this information, a prediction can be made about when the subscriber is expected to attach. In certain implementations, the HSS is configured to copy the subscriber profile information relevant to a particular subscriber/UE from the PSDB to the DSDB shortly before the subscriber is expected to attach (e.g., a few seconds typically, but as long as the copy is complete before the start of the transaction, other lead times are within the scope of the invention). Thus, upon attachment, the HSS finds the needed subscriber information already present in the relatively low-latency DSDB and avoids the need to retrieve the information from the relatively high-latency PSDB.

In some embodiments, the HSS can make predictions about likely future connections of one or more subscribers or requests related to one or more subscribers based on information collected about the subscribers and/or connections. For example, information such as UE location, access times, duration of access, frequency of access, nature of access (e.g., protocols used by subscriber such as SCTP access, encrypted SCTP access, or usage of Facebook or other web applications), device type (e.g., determined from an International Mobile Equipment Identity ("IMEI")), subscription parameters (e.g., a subscriber may have purchased a plan for access once an hour/day or for a fixed amount of data) can be collected about the one or more subscribers. This information can be fed into a learning algorithm (e.g., using machine learning techniques) to make a prediction about potential future occurrences of actions taken with respect to a subscriber such as future access times. In some embodiments, information can be collected using deep packet inspection techniques.

In another implementation, the HSS learns during a setup process of the subscriber/UE a target window of time during which a subscriber/UE is configured to attach to the network for data transfer. For example, the HSS can receive such information from an enterprise application server with which an UE exchanges data. The HSS can receive this information on initial setup/configuration/provisioning of the particular UE, or an application server (or other internal network or external network entity) can provide this information at a later time. Likewise, the application server can inform the HSS of any target attachment window changes.

Based on the target attachment window configuration for a given subscriber/UE, the HSS retrieves the subscriber information from the PSDB and writes it to the DSDB shortly before the target subscriber attachment window. Thus, upon attachment, the HSS finds the needed subscriber information already present in the relatively low-latency DSDB and avoids the need to retrieve the information from the relatively high-latency PSDB.

In yet another embodiment, the HSS monitors communications between network entities to detect monitoring event notifications which indicate that subscriber profile information will be needed (e.g., a network entity other than the HSS has detected that the UE has attached to the network.) The HSS analyses the monitoring event notifications to learn of any patterns in the schedule according to which subscriber profile information is needed. For example, a monitoring event is configured in an SCEF entity to watch for the attachment of a particular UE. Upon the attachment, the SCEF entity sends a notice of the attachment. The HSS receives the notices and determines the likely repeating attachment schedule of the UE. This technique captures times when other non-UE entities need access to subscriber profile information via the HSS.

Thus, based on the learned schedule, shortly before the subscriber profile information is needed, the HSS copies the subscriber profile information for the subscriber from the PSDB to the DSDB. Thus, like the examples above, upon attachment, the HSS finds the needed subscriber information already present in the relatively low-latency DSDB and avoids the need to retrieve the information from the relatively high-latency PSDB.

In some embodiments, the HSS can predict or learn of a time of future potential connections of one or more subscribers or future potential requests related to one or more subscribers. In such scenarios, the HSS can retain a record, at the end of a transaction, related to one or more subscribers in the DSDB at least until the predicted time of a future potential connection of the one or more subscribers or until the predicted time of a future potential request related to the one or more subscribers. The HSS can also remove the record from the DSDB if the next predicted time is beyond a certain threshold or after the predicted time of a future potential connection or request related to the one or more subscribers. With this approach, the subsequent transaction is likely to find the record in the relatively low-latency DSDB.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and call flows described in this specification, including the method steps of the subject matter described herein, can be performed by one or more programmable processors executing one or more computer programs to perform functions of the subject matter described herein by operating on input data and generating output. The processes and call flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A system for storing and managing subscription information for a plurality of subscribers in a mobile communications network, comprising:
   one or more processors;
   memory in electronic communication with the one or more processors;
   a first database of a first type stored in the memory, wherein the first database comprises information for a subset of the plurality of subscribers in the mobile communications network, the subset comprising subscribers that have currently active transactions;
   a second database of a second type stored in the memory, wherein the second database comprises subscriber information for the plurality of subscribers in the mobile communications network; and
   instructions stored in the memory, the instructions being executable by the one or more processors to:
      monitor communications between network entities;
      collect information about the plurality of subscribers using deep packet inspection techniques;
      analyze the information using a machine learning algorithm;
      determine a pattern according to which the plurality of subscribers attach to the mobile communications network based at least in part on results of analyzing the information using the machine learning algorithm;
      predict a time of a potential occurrence of one or more future connections based on the pattern;
      before the predicted time, copy one or more records related to the plurality of subscribers from the second database to the first database based on predictions about the one or more future connections;
      receive a request relating to a transaction involving a subscriber, the request being received after the one or more records have been copied to the first database;
      retrieve a record corresponding to the subscriber from the first database;
      perform one or more functions related to the record according to the request; and
      write updated information related to the subscriber to the second database when the transaction concludes.

2. The system of claim 1, wherein the one or more processors is further configured to:
   determine, during a setup process, a future time span during which the subscriber is configured to attach to the mobile communications network, and
   copy the record relating to the subscriber from the second database to the first database based on the future time span.

3. The system of claim 1, wherein the first database and the second database are implemented as a virtual machine, a container, or a container on a virtual machine.

4. The system of claim 1, wherein the one or more processors are further configured to:
   predict a time of a potential future request relating to the subscriber,
   retain the desired record in the first database at least until after the predicted time of the potential future request relating to the subscriber, and
   remove the desired record from the first database after the predicted time of the potential future request relating to the subscriber.

5. The system of claim 1, wherein the second database provides records to more than one database of the first type.

6. The system of claim 1, wherein the first type comprises one or more of a NoSQL database, a horizontal data partition, an in-memory database, and a flash memory-based database.

7. The system of claim 1, wherein the second type comprises a SQL database.

8. A method for storing and managing subscription information for a plurality of subscribers in a mobile communications network, comprising:
   providing a first database of a first type, the first database comprising information for a subset of the plurality of subscribers in the mobile communications network, the subset comprising subscribers that have currently active transactions, and wherein the first database is configured to scale with a number of interfaces present in a main subscriber database of the mobile communications network;

providing a second database of a second type, the second database comprising subscriber information for the plurality of subscribers in the mobile communications network, and wherein the second database is configured to scale with a number of subscribers in the mobile communications network;

receiving a request relating to a transaction involving a subscriber;

determining that the first database lacks a desired record relating to the subscriber;

retrieving the desired record from the second database;

writing a record to the first database, the record corresponding to the desired record in the second database;

performing one or more functions related to the record according to the request; and writing updated information related to the subscriber to the second database when the transaction concludes.

9. The method of claim 8, further comprising:
monitoring connections of the plurality of subscribers,
determining a pattern according to which the plurality of subscribers attach to the mobile communications network based on the monitored connections of the plurality of subscribers,
predicting a time of a potential occurrence of one or more future connections related to the plurality of subscribers based on the pattern, and
before the predicted time, copying one or more subscriber records related to the plurality of subscribers from the second database to the first database.

10. The method of claim 9, wherein predicting a time of potential occurrence of one or more future connections comprises:
collecting information related to one or more of a location, an access time, a duration of access, a frequency of access, a device type, and a subscription parameter, and
analyzing the collected information using a machine learning algorithm.

11. The method of claim 8, further comprising:
determining, during a setup process, a future time span during which the subscriber is configured to attach to the mobile communications network, and
copying the record relating to the subscriber from the second database to the first database based on the future time span.

12. The method of claim 8, further comprising:
monitoring communications between network entities,
detecting event notifications related to the plurality of subscribers,
determining a pattern according to which the plurality of subscribers attach to the mobile communications network based on the event notifications,
predicting a time of a potential occurrence of one or more future connections based on the pattern, and
before the predicted time, copying one or more records related to the plurality of subscribers from the second database to the first database based on the one or more future connections.

13. The method of claim 8, wherein the first database and the second database are implemented as a virtual machine, a container, or a container on a virtual machine.

14. The method of claim 8, further comprising:
predicting a time of a potential future request relating to the subscriber, retaining the desired record in the first database at least until after the predicted time of the potential future request relating to the subscriber, and
removing the desired record from the first database after the predicted time of the potential future request relating to the subscriber.

15. The method of claim 8, wherein the second database provides records to more than one database of the first type.

16. The method of claim 8, wherein the first type comprises one or more of a NoSQL database, a horizontal data partition, an in-memory database, and a flash memory-based database.

17. The method of claim 8, wherein the second type comprises a SQL database.

18. A system for storing and managing subscription information for a plurality of subscribers in a mobile communications network, comprising:
one or more processors;
memory in electronic communication with the one or more processors;
a first database of a first type stored in the memory, wherein the first database comprises information for a subset of the plurality of subscribers in the mobile communications network, wherein the subset comprises subscribers that have currently active transactions, and wherein the first database is configured to scale with a number of interfaces present in a main subscriber database of the mobile communications network;
a second database of a second type stored in the memory, wherein the second database comprises subscriber information for the plurality of subscribers in the mobile communications network, and wherein the second database is configured to scale with a number of subscribers in the mobile communications network; and
instructions stored in the memory, the instructions being executable by the one or more processors to:
receive a request relating to a transaction involving a subscriber;
determine that the first database lacks a desired record relating to the subscriber;
retrieve the desired record from the second database;
write a record to the first database, the record corresponding to the desired record in the second database;
perform one or more functions related to the record according to the request; and
write updated information related to the subscriber to the second database when the transaction concludes.

* * * * *